United States Patent [19]

Morgan

[11] Patent Number: 4,928,863
[45] Date of Patent: May 29, 1990

[54] BICYCLE RACK FOR CARRYING SPORT BOARDS

[76] Inventor: Robert D. Morgan, 1539 Jay St., Carpinteria, Calif. 93013

[21] Appl. No.: 307,106

[22] Filed: Feb. 6, 1989

[51] Int. Cl.$^5$ .............................................. B62J 11/00
[52] U.S. Cl. .................................... 224/39; 224/32 A
[58] Field of Search ................ 224/30 R, 32 A, 33 R, 224/37, 38, 39, 40; 280/202, 769; 211/60.1, 86

[56] References Cited

U.S. PATENT DOCUMENTS

| | | | |
|---|---|---|---|
| 3,547,325 | 12/1970 | Hill | 224/39 R |
| 3,659,761 | 5/1972 | Wesson | 224/39 R |
| 4,296,878 | 10/1981 | Ward et al. | 224/32 A |
| 4,393,986 | 7/1983 | Sirey | 224/32 A |
| 4,792,072 | 12/1988 | Gibson | 224/32 A |

Primary Examiner—Linda J. Sholl
Attorney, Agent, or Firm—Donald D. Mon

[57] ABSTRACT

A bicycle rack to carry a sport board. A retainer is rotatably mounted to the bicycle frame. A strut whose length is adjustable is rotatably mounted to the rear wheel mount and is also connected to the retainer. The rack can be fitted to various bicycle sizes and configurations, with the retainer adjusted horizontally. A loop is carried by the strut to receive an end of the board, and a bend in the retainer receives an edge of the board. An elastic device holds the board in the bend.

10 Claims, 1 Drawing Sheet

U.S. Patent   May 29, 1990   4,928,863

# BICYCLE RACK FOR CARRYING SPORT BOARDS

FIELD OF THE INVENTION

This invention relates to a rack attached to a bicycle for carrying sport boards such as surfboards and skateboards.

BACKGROUND OF THE INVENTION

A bicycle rider who carries a sportboard loosely while riding his bicycle engages in a rather risky practice. Wind currents, irregularities in the road surface, and sudden changes in velocity or direction of the bicycle are only some situations which cause the board to shift and exert forces that can decontrol the bicycle. Even if the rider quickly dumps the board, the dangers still may not be averted. The board might instead become an obstacle or barrier, or project into the spokes, or control may be so far lost that it cannot be regained in time. Damage to the board and injury to the rider can frequently be expected.

Still the rider often has no other practical way to get to the beach or wherever else he might wish to use the board, and he accepts the risks. Often enough he will regard these as tame compared to those of the board sport itself.

Bicycle racks have in fact been devised to carry sport boards. They have not attained substantial acceptance, largely because they do not work well or are commercially impractical. Existing racks known to the instant inventor do not sufficiently stabilize the board relative to the bicycle frame. In fact they frequently permit the board to tilt forwardly and strike the rider upon a sudden stop or an abrupt change in direction such as passing over a curb.

Also they are not adaptable to a range of bicycle frame sizes. As a result one rack will properly fit only one size of one frame configuration. Unless the manufacturer makes and the retailer stocks a specific rack for each frame size and configuration the same rack will make only a compromise fit with another frame size or configuration.

It addition, the rider may own different boards of different sizes. The rack should be adaptable to carry a plurality of sizes with little effort to accommodate the change in size of the board to be carried.

This invention provides a rack of elegantly simple configuration which can readily solve one or more of the above problems, depending on the number of features it is to include.

BRIEF DESCRIPTION OF THE INVENTION

A rack according to this invention is adapted to be attached at a first point to a bicycle frame, and at a second point to the frame at the center of rotation of the rear wheel. A longitudinally extending retainer is attached at the first point and extends rearwardly to a U-shaped bend. An elastic strap such as a bungee strap is detachably attached to the free end of the bend and to the retainer at a location spaced from it, so where it is attached, it presses a board into the bend and against the retainer, and holds the board in place.

A strut is pivotally attached to the frame at the second point, and is attached to the retainer at third point spaced from the first point. Adjustment means is provided as part of the strut to enable the strut to be lengthened and shortened. This enables a single rack to be fitted to bicycles of different frame configuration, while locating the retainer wheel size and frame configuration, while locating the retainer in a substantially horizontal position. This provides for optimum carriage of the board, and a better looking assembly.

A pocket member is attached to the strut. It forms an open rigid loop into which an end of the board can be inserted. At least one end of the board is usually tapered, so it fits nicely into this pocket.

According to a preferred but optional feature of the invention, the pocket member includes a slide means which enables the longitudinal dimension of the pocket adjustably to be varied to receive boards of different sizes.

According to yet another preferred but optional feature of the invention the strut member is hook-shaped and is attached to the frame at both sides of the wheel to provide an increased lateral strength that is desirable for the larger surfboards, although not always required for small boogie boards or for skateboards because of their smaller size and lighter weight.

The above and other features of this invention will be fully understood from the following detailed description and the accompanying drawings, in which:

DETAILED DESCRIPTION OF THE DRAWINGS

Figure 1:
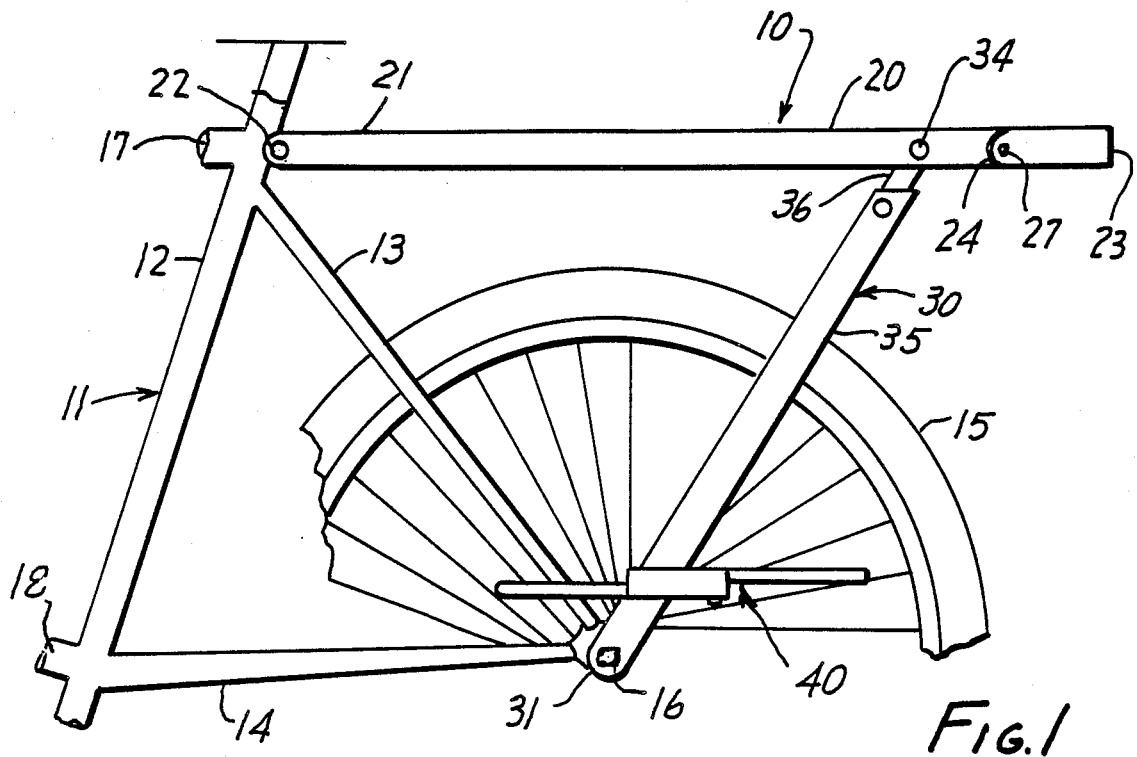
FIG. 1 is a fragmentary side elevation showing the presently-preferred embodiment of the invention.
Figure 2:
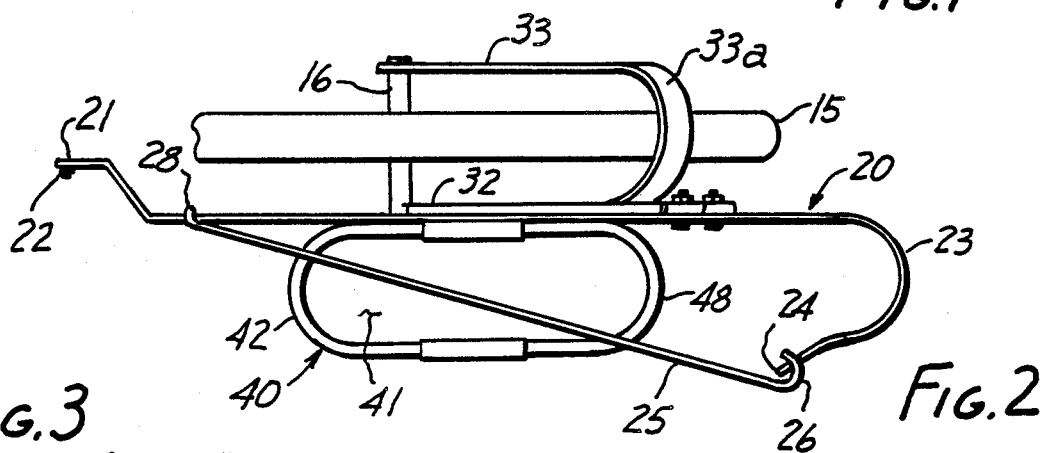
FIG. 2 is a top view of FIG. 1.
Figure 3:
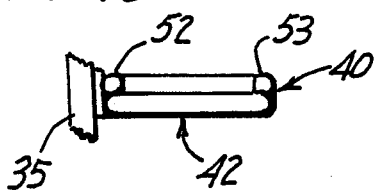
FIG. 3 is a fragmentary cross-section taken in FIG. 1, and at line 3—3 in FIG. 4.
Figure 4:
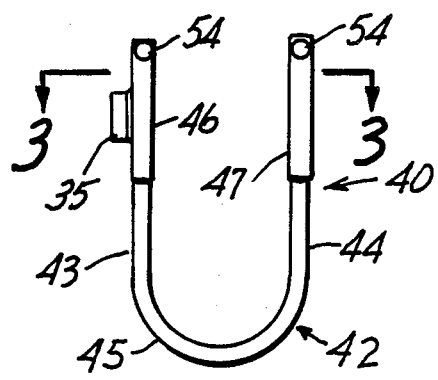
FIG. 4 is a fragmentary showing of a portion of FIG. 1.
Figure 5:
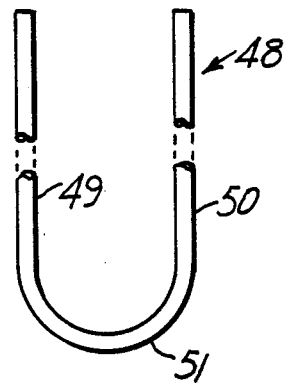
FIG. 5 is a side view of part of the pocket member.

A bicycle rack 10 according to this invention is used in combination with a rigid bicycle frame 11. While bicycle frames vary widely in size and configuration, they customarily include a seat post 12, a first pair of rear wheel mounts 13 and a second pair of rear wheel mounts 14. The wheel mounts of each pair are disposed on opposite sides of a rear wheel 15. The seat post and wheel mounts form a rigid triangular structure which mounts the rear wheel. In particular they support a central bolt or axle 16 that establishes the center of rotation of the wheel.

Other frame members 17, 18 extend forwardly to a steering post and steering fork, which are conventional and of no importance to this invention.

Rack 10 includes a retainer member 20 which extends generally in the longitudinal direction of forward motion. Its fixed end 21 is attached such as by a screw or nut-bolt sets to the frame at a first point 22, preferably to or near to the seat post. It may conveniently be a piece of strap steel formed to the shape shown in the Figs. It extends rearwardly to a U-shaped bend 23, which has a free-end 24 pointing forwardly.

An elastic strap 25 is detachably attached to the free end. In its preferred embodiment it has a hook 26 insertable into a hole 27 in the retainer. The other end of the strap is attached to the retainer member, although preferably not in a fixed location. Preferably the elastic strap has a loop 28 passed over the retainer member. Then it can be slid along the retainer member to accommodate boards of various widths. The hook may be taken out of the hole to admit the board, and re-inserted to hold it in place. The loop is pushed toward the board so as to make a tight fit against it. The elastic strap may be such as a classical bungee cord. This is a strong elastic product which can exert a substantial restorative force.

A strut 30 is attached to the frame at a second point 31, preferably coincident with the center of rotation of the rear wheel. The bolts characteristically found in rear wheel installations can be passed through holes in the strut so as rotatably to mount the strut to the frame.

In the illustrated preferred embodiment of the invention, the strut is hoop-shaped, having a leg 32 and a leg 33 on opposite sides of the wheel, and a central bight 33a overhanging the rear wheel. This will provide strong sideward support for carrying a large or heavy board. When only lighter and smaller boards are to be carried, only leg 32 need be provided. These legs do not change length. They are the reference structure for the strut.

Leg 32 includes an adjustment feature to change the length of the strut between the second point (wheel center), and a third point 34 on the retainer member. For this purpose, base portion 35 of leg 32 is made hollow, preferably of a rectangular cross-section extrusion, and is attached to the frame at the second point. A slide portion 36 of the leg is attached to the retainer, and extends into the base portion. It can slide in it to enable the length of the leg to be adjusted.

Fastener means such as a pin passed through holes in the leg portions can select and set the length. A plurality of spaced apart holes in the slide portion can receive the pin. Alternately a thumbscrew arrangement threaded through the base portion to bear against the leg or even enter into a selected hole in the slide portion, can instead serve this purpose.

A pocket member 40 is attached to leg 32. It is intended to form an open loop 41 into which the board will fit. It is made in two parts so that its longitudinal dimension can be adjusted. A first hoop 42 has two legs 43, 44 and a central bight 45. Its legs fit into open-ended sleeves 46, 47 mounted to the strut. A second hoop 48 has legs 49, 50 and a central bight 51. These legs slide in sleeves 52, 53, and fastener means 54 can be tightened down to hold all of them. Thus this forms means to adjust the longitudinal dimension of the hoop.

All surfaces against which the board will bear may be appropriately padded to protect the board, and to provide an even more reliable grip on the board.

The construction and adjustment of the rack should be evident from the foregoing. Once the retainer and the strut are pinned to the frame, it is only necessary to adjust the length of the strut to place the retainer in as nearly a horizontal alignment as feasible.

Then the elastic cord is released from the free end of the retainer and an end of the board is placed in the pocket. The loop of the elastic strap is pushed toward the board, and the hook is again engaged to the free end of the retainer. The board is now strongly held to the rack and to the bicycle, and even relatively vigorous wind and physical forces are less likely to destabilize the running bicycle.

The structure is elegantly simple, easy to install, and adaptable to hold boards in wide ranges of size, weight and shape. It is adaptable to a wide range of frame configurations and wheel sizes.

If the rack is intended to hold only smaller items such as skateboards, it often will be unnecessary to provide adjustment for the pocket size.

This invention is not to be limited to the embodiments shown in the drawings and described in the description, which are given by way of example and not of limitation, but only in accordance with the scope of the appended claims.

I claim:

1. In combination:
a bicycle frame providing a structural support and also providing a mount for a rear wheel, and;
a bicycle rack comprising a retainer member having a first end pivotally attached to said frame at a first point, a U-shaped bend spaced from said first point and a free end on said bend, and an elastic strap attached to said retainer member at a point between its ends, and to the said free end of said ends being detachably to said retainer member; a strut rotatably pivotally mounted to said frame at a second point, and rotatably mounted to said retainer member at a third point, said strut including adjustment means enabling its length adjustably to be changed; and a pocket member attached to said strut forming an open loop to receive an end of a sport board;
whereby said bicycle rack can be adjusted to said frame to place the retainer member substantially horizontally on said frame by adjusting the length of the strut with said adjustment means, and whereby a sport board can be carried by said rack, by releasing said elastic cord to exert a retentive force on the board pressing it toward the retainer member and into the bend.

2. A combination according to claim 1 in which said adjustment means comprises said strut comprising a pair of members which can be shifted relative to one another, and engagement means to hold said last named members in a selected position relative to one another.

3. A combination according to claim 1 in which said strut comprises a pair of legs, one on each side of said frame, and a bight joining them together.

4. A combination according to claim 3 in which a slide member is movably attached to each of said legs, to form part of said strut, said slide members being attached to the retainer member at said second point, said engagement means holding the respective slide member to its respective leg at a selected position whereby selectively to adjust the effective length of said legs.

5. A combination according to claim 1 in which said pocket member comprises a pair of hoops each having a pair of legs, the legs of said hoops being joined parallel to each other to form said legs, and being releasably fastened together to enable the distance between the bights selectively to be adjusted.

6. A combination according to claim 1 in which one end of said elastic strap is slidably attached to said retainer member at a location between said first point and said bend, and a hook/eye assembly, one part of said hook/eye assembly being on said other end of said elastic strap, and the other part is at said free end of the bend.

7. A combination according to claim 1 in which said one end of the strap is formed as a loop around the retainer member.

8. A combination according to claim 6 in which said adjustment means comprises struts comprising a pair of members which can be shifted relative to one another, and engagement means to hold them in a selected position relative to one another.

9. A combination according to claim 6 in which said strut comprises a pair of legs, one on each side of said frame, and a bight joining said legs together.

10. A combination according to claim 9 in which a slide member is movably attached to the retainer at said second point, and engagement means to hold the slide member to the leg at a selected position whereby selectively to adjust the effective length of said strut.

* * * * *